(12) United States Patent
Araya et al.

(10) Patent No.: US 11,328,115 B2
(45) Date of Patent: May 10, 2022

(54) SELF-ASSERTED CLAIMS PROVIDER

(71) Applicant: MICROSOFT TECHNOLOGY LICENSING, LLC., Redmond, WA (US)

(72) Inventors: John Araya, Seattle, WA (US); Muhammad Omer Iqbal, Redmond, WA (US); Raja Chau Vikram Kakumani, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 605 days.

(21) Appl. No.: 16/039,755

(22) Filed: Jul. 19, 2018

(65) Prior Publication Data

US 2019/0347403 A1 Nov. 14, 2019

Related U.S. Application Data

(60) Provisional application No. 62/669,911, filed on May 10, 2018.

(51) Int. Cl.
*G06F 40/143* (2020.01)
*G06F 21/45* (2013.01)
*G06F 9/50* (2006.01)
*G06F 21/33* (2013.01)

(52) U.S. Cl.
CPC .......... *G06F 40/143* (2020.01); *G06F 9/5072* (2013.01); *G06F 21/33* (2013.01); *G06F 21/45* (2013.01)

(58) Field of Classification Search
CPC .......... G06F 21/45; G06F 40/14; G06F 21/33; G06F 9/5072; G06F 40/174; G06F 40/143
See application file for complete search history.

(56) References Cited

U.S. PATENT DOCUMENTS

| 8,078,880 | B2 | 12/2011 | Nanda et al. |
| 8,117,459 | B2 | 2/2012 | Cameron et al. |
| 8,850,550 | B2* | 9/2014 | Dalzell ................. G06F 21/335 726/9 |
| 8,910,257 | B2 | 12/2014 | Alexander et al. |
| 10,585,682 | B2* | 3/2020 | Jain ..................... H04L 63/1408 |
| 2012/0167197 | A1* | 6/2012 | Kruger ................... G06F 21/62 726/16 |

(Continued)

OTHER PUBLICATIONS

Jones et al., RFC 7519 "JSON Web Token", May 2015, Internet Engineering Task Force, https://tools.ietf.org/html/rfc7519.*

(Continued)

*Primary Examiner* — Robert B Leung

(57) ABSTRACT

A business-to-consumer (B2C) cloud service hosts web applications of various businesses as an instance of a cloud service. The B2C cloud service provides an identity management engine that manages the sign-in of consumers of the businesses to a respective cloud service. The identity management engine dynamically creates a security token for the sign-in request that includes claims customized for the hosted cloud service. The claims are based on directives provided by the business and obtained from the consumer via a user interface dynamically created by the identity management engine at a sign-in request.

20 Claims, 4 Drawing Sheets

(56) References Cited

U.S. PATENT DOCUMENTS

| | | | | |
|---|---|---|---|---|
| 2016/0087957 A1* | 3/2016 | Shah | ............... | H04L 63/08 |
| | | | | 726/1 |
| 2016/0088017 A1* | 3/2016 | Green | ............... | H04L 63/20 |
| | | | | 726/1 |
| 2016/0381080 A1* | 12/2016 | Reddem | ............... | G06F 21/31 |
| | | | | 726/1 |
| 2017/0331829 A1* | 11/2017 | Lander | ............... | H04L 67/02 |
| 2019/0079782 A1* | 3/2019 | Goldberg | ............... | H04L 67/2823 |
| 2019/0103968 A1* | 4/2019 | Srinivasan | ............... | G06F 21/41 |

OTHER PUBLICATIONS

"Azure Active Directory B2C: Custom policies", May 11, 2017, retrieved at: <<https://docs.microsoft.com/en-us/azure/active-directory-b2c/active-directory-b2c-overview-custom>>, pp. 8.

* cited by examiner

SELF-ASSERTED CLAIMS PROVIDER

CROSS-REFERENCE TO RELATED APPLICATION

This application claims the benefit of U.S. Provisional Application No. 62/669,911 filed on May 10, 2018.

BACKGROUND

A distributed networked computing system, such as a cloud service, often utilizes a login or sign-in process for the user to gain access to the cloud service. The user provides credentials such as a user name identifier and a password which the sign-in process uses to authenticate the identity of the user and to authorize the user to access certain resources of the cloud service.

A business-to-consumer (B2C) cloud service is a distributed networked directory service that hosts multiple cloud services for various business entities though a networked directory that stores the web applications and resources of a hosted cloud service. The B2C cloud service also manages the access to a hosted cloud service by the users or consumers of a hosted cloud service. The B2C cloud service may utilize a standard set of pre-defined configurations that define the manner in which the users to a hosted cloud service may sign-in to the hosted cloud service and the credentials that are used to authenticate the users. However, the use of the standard set of pre-defined configurations minimizes the amount of choices that the hosted cloud service can utilize in a login process.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A business-to-consumer (B2C) cloud service hosts web applications or cloud services of various businesses. The B2C cloud service provides an identity management engine that manages the sign-in of consumers of the businesses to a respective hosted cloud service. The identity management engine dynamically creates a user interface at each sign-in of a consumer of the hosted cloud service. The user interface is customized specifically for the hosted web application and used to obtain one or more claims which are used to authenticate the consumer requesting access to the hosted cloud service. The claims are based on directives provided by the business and as such, provide the consumer with a customized sign-in process uniquely tailored for the hosted web application.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
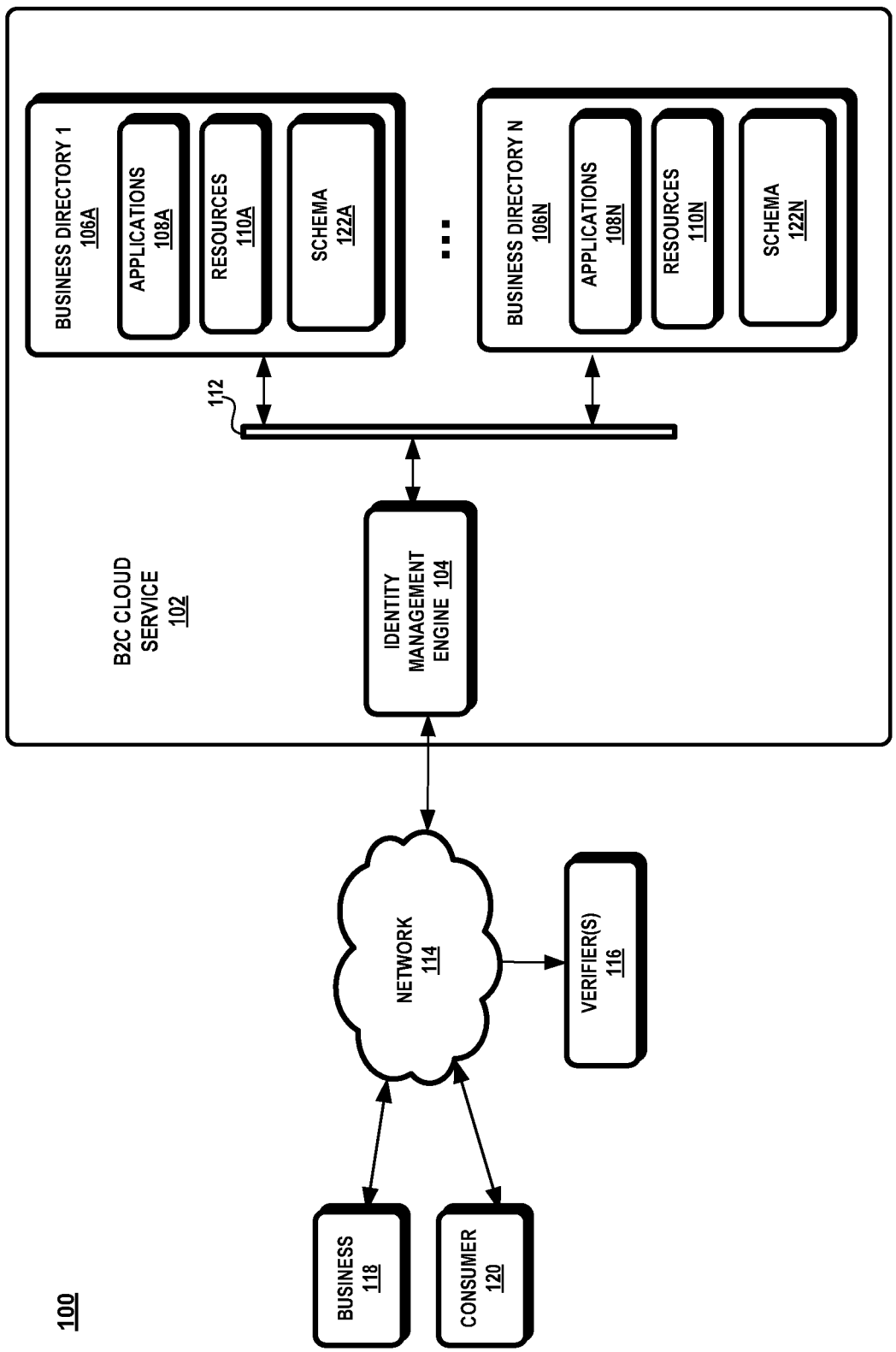
FIG. 1 illustrates an exemplary system of a self-asserted claims provider.

The subject matter disclosed pertains to a B2C cloud service that hosts cloud services for one or more businesses. The B2C cloud service enables a business to specify the claims that a consumer of the business may use to obtain access to the hosted cloud service. The claims are customized for a particular business by the business and implemented by the cloud service. The claims are obtained from a consumer through a dynamically-generated user interface each time a consumer of the hosted cloud service signs-in. The claims may be verified by an external source or the claims may be trusted without verification. The claims are then embedded into a security token that is directed to the hosted cloud service.

A B2C cloud service is a distributed networked directory service that generates an instance of a cloud service to host a business's web applications and resources. The business uses the B2C cloud service to hosts its web applications and resources as a cloud service and outsources to the B2C cloud service authentication of its consumers. To fulfill this task, the B2C cloud service includes an identity management engine that performs a variety of identity-related tasks such as, without limitation, enabling a consumer to sign-up or register to use a business's web applications and/or resources, enabling the registered consumer to sign-in and use the business's web applications and/or resources, enabling the consumer to sign-up using specific identity providers, and customizing the sign-up and sign-in user interface for each consumer.

In one aspect, the identity management engine interacts with the consumer of a business, whose cloud service is hosted by the B2C cloud service, to verify the identity of the consumer and to issue a security token upon successful verification of the consumer's identity. The identity management engine generates claims about the consumer which are embedded into the security token. The security token is then used to obtain access to the web application of the business's cloud service.

A claim is a statement that one subject makes about itself or another subject. The statement may be a name, identity, key, group, privilege or capability. Claims are issued by a claims provider and given one or more values. A claims provider is a software component or service that issues one or more claims during a sign-in process. The claims are packaged as part of a security token that is issued by a security token service. The security token is tailored for a particular user which is then used to access the business's cloud service. The business's cloud service uses the claims in the security token to authorize the user to those web applications and resources authorized by the security token.

In one aspect, the B2C cloud service uses a schema to identify one or more of the following: the claims that are to be used in the authentication of a consumer to the hosted cloud service; to indicate whether the claims are to be verified or not; the verifiers for the verified claims; to identity accounts to be used in the sign-in process; to indicate the protocols used in the verification; the types of security tokens; and so forth. In this manner, the B2C cloud service allows the business to act as its own claims provider within the framework of the B2C cloud service.

The identity management service uses the schema to dynamically generate a user interface for a business's consumer each time the consumer performs a sign-in. The user interface is customized for a particular business based on the business's schema which describes the types of information that may be used as claims and how the claims are to be processed. The user interface captures the consumer's claims which may be verified in real time.

The schema may indicate that the claims are to be verified. If not, the claims are trusted and no verification is needed. A verifier maybe an external source that can authenticate the veracity of the claims or the claims may be verified internally by the B2C cloud service. Upon successful verification of the claims, the identify management engine generates claims based on the user's input which are then embedded into a security token. The security token is then used by the business's web application to authorize the consumer's access to those applications and resources permitted by the claims.

Attention now turns to a description of a system for a self-asserted claims provider.

Self-Asserted Claims Provider System

Turning to FIG. 1, there is shown an exemplary system embodying the self-asserted claims provider. The system 100 includes a B2C cloud service 102 including an identity management engine 104 coupled to one or more business directories 106a-106n (business directory 1-business directory n, collectively, "106") through a network 112. A business directory 106 is an instance of a cloud service which contains one or more applications 108a-108n (collectively, "108"), resources 110a-110n (collectively, "110"), and a schema 122a-n (collectively, "122") of the cloud service. The applications 108 may include web applications and the resources 110 may include profiles of the business's consumers, and the schema 122. The identity management engine 104 communicates through network 114 with one or more businesses 116 having a business directory on the B2C cloud service 102 and the consumers 118 of the businesses having a hosted web application in the B2C cloud service 102.

The identity management engine 104 provides a user authentication service that uses credentials or claims to access the applications 108 and resources 110 of a business directory 106. The identity management engine 104 communicates with one or more external verifiers 112 through a network 114 to verify the user's input that will make up a claim. If the claim utilizes a person's name, address and/or phone number, the identify management engine 104 may verify the person's name, address and/or phone number with a background check verifier, local phone company, cellular provider, county property records verifier, etc.

A business 118 registers with the B2C cloud service 102 to utilize the services of the B2C cloud service 102. The business is then able to tailor the sign-in process in a manner preferred by the business. The business is able to specify the claims used to authenticate a user, the account types used in the sign-in process, whether the claims are to be trusted or verified, the verifiers used to verify claims, the types of security tokens to be used, the protocols to be used in the authentication and authorization process, and so forth. In one aspect, a schema 122 is used to embody the business's unique sign-in configuration which is stored in the business's directory 106.

Although FIG. 1 depicts the system and process in a particular configuration, it should be noted that the subject matter disclosed herein is not constrained to the configuration shown in FIG. 1. For example, the business 118 and the consumer 120 may utilize a rich client rather than a browser to interact with the B2C cloud service. A rich client is an application on a computing device that retrieves data from the Internet without the use of a browser.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2:
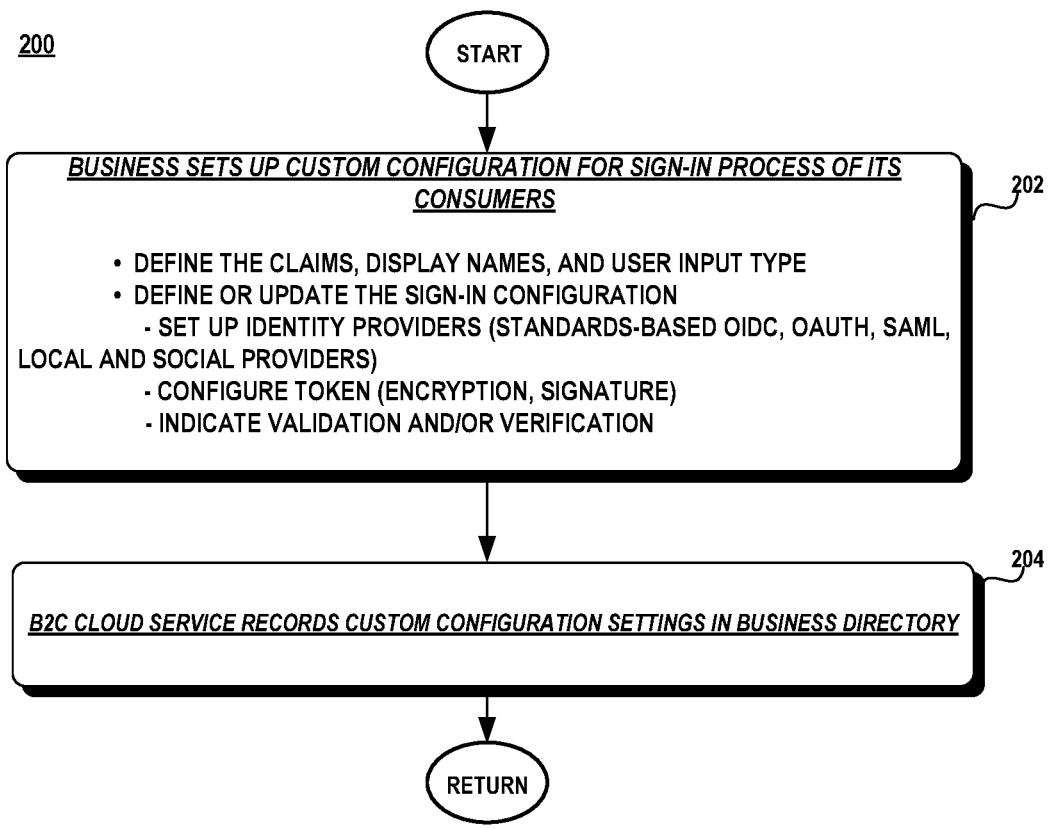
FIG. 2 is a flow diagram illustrating an exemplary method used to configure a schema that describes types of claims for accessing a business's cloud service hosted on the B2C cloud service.

FIG. 2 illustrates a method performed by a business to customize the claims used to access the business's applications and resources. In one aspect, a set of custom configurations or policies are used to specify the data and protocols used in the authentication of the sign-in process. The set of custom configurations may be embedded in a schema that may be implemented as one or more Extensible Markup Language (XML) files, JavaScript Notation (JSON) files and the like. The business may be provided with a set of template XML files which the business uses to customize its schema for its intended purpose. The business uses the schema to set up custom configurations for the sign-in process of its consumers, and in particular, to identify its claims (block 202). In particular, the business uses the schema to define the claims, provide the display names and the user input type for each claim. In addition, the business may define or update the sign-in configuration to set up the identity providers, such as without limitation, standards-based OpenId Connect (OIDC), OAUTH, Security Assertion Markup Language (SAML), as well as local and social networking providers (e.g., Linkedin, Facebook, etc.). The business may also configure the security token and related protocols and indicate the validation and/or verification processes to be applied to the claims. These custom configuration settings are then recorded into the business's directory (block 204).

For example, the schema may define a claim, its display name, and the user input type using the following exemplary XML code:

```
<ClaimType Id="city">
    <DisplayName>city</DisplayName>
    <DataType>string</DataType>
    <UserHelpText>Your city</UserHelpText>
    <UserInputType>TextBox</UserInputType>
    <Restriction>
        <Pattern Regular Expression="'[a-zA-Z0-9,!#$%&'"_( ) –+@[a-zA-Z0-9-] + (? : \ . [a-zA-Z0-9-] + )*$">
    </Restriction>
</ClaimType>
``` where <DisplayName> is a string that represents the user facing label, <DataType> represents the type of the claim, <UserHelpText> helps the user understand what is required, <UserInputType> represents the user interface icon that will be used to obtain the value of the claim. In this example, the UserInputType is a text box. This code snippet illustrates how the business defines a claim and the manner in which a user interface obtains the claim from the consumer at a sign-in process.

The schema may also specify how to validate a claim. In the preceding example, the <Restriction> tag is used to validate the city name as a regular expression using the <Pattern Regular Expression> tag.

The schema may also define the claims that are embedded into a token. The following XML code fragment is used to define an email address and a shoe size as the claims that will be embedded into a token using the <OutputClaims> tag.

```
<OutputClaims>
    <OutputClaim ClaimTypeReferenceId = "email"/>
    <OutputClaim ClaimTypeReferenceId = "extension_shoeSize" />
</OutputClaims>
```

The schema may also specify how to construct a token. In one aspect, the B2C cloud service uses a JSON web token (JWT) as the security token that will contain the claims. The JWT is associated with an open standard (RFC 7519) that defines a protocol for securely transmitting information between two parties as a JSON object. The JWT can be signed using a secret or a public/private key pair using Rivest-Shamir-Adleman (RSA). It should be noted that the B2C cloud service may utilize other types of tokens and associated protocols, such as without limitation, Web Services Federation (WsFed), WsTrust, Security Assertion Markup Language (SAML) protocols and tokens.

The following XML code fragment defines the Technical Profile, the token and the construction of the token:

```
        <TechnicalProfile Id = "JwtIssuer">
<DisplayName> JWT Issuer </DisplayName>
<Protocol Name ="None" />
<OutputTokenFormat>JWT</OutputTokenFormat>
<Metadata>
    <Item Key = "client id" (service : te )</Item>
    <ItemKey = "issuer_refresh_token_user_identity_claim_type">
        objectID</Item>
    <ItemKey = "SendTokenResponseBodyWithJasonNumbers">true
        </Item>
    </Metadata>
 <CryptographicKeys>
    <Key Id = "issuer secret" StorageReferenceId=
```

-continued

```
    "B2C_1A_TokenSigningKeyContainer"/>
    <Key Id = "issuer_refresh_token_key"
StorageReferenceId="B2C_1A_TokenEncryption Container"/>
 </CryptographicKeys>
<InputClaims/>
<Output Claims/>
</Technical Profile>
``` where the name of the Technical Profile is identified in the <TechnicalProfile Id> tag, <DisplayName> is a string that represents the user facing label, the <OutputTokenFormat> tag identifies the type of token which in this case is a JWT token, the <Item Key> tags in the <Metadata> section defines the different keys used in the token, and the <Key Id> tags in the <CryptographicKeys> section identify which keys are used to sign and encrypt the token.

The schema may also identify how to invoke an external verifier to verify a claim. For example, the following XML code fragment uses another TechnicalProfile to define a RESTful web service for use in authenticating claims.

```
    <TechnicalProfileId="RestfulProvider-BasicAuth">
    <DisplayName>Restful Claim Provider</DisplayName>
    <Protocol   Name="Proprietary"   Handler="Web.TPEngine.Provider.RestfulProvider,
Web.TPEngine, Version1.0.0.0, Culture=neutral,PublicKeyToken=null"/>
        <Metadata>
            <Item
Key="ServiceUrl">https://reflector.trafficmanager.net/rest/basic/restfulbasicauthresponder.aspx</Item>
            <Item Key="AuthenticationType">Basic</Item>
        </Metadata>
        <Cryptographic Keys>
        <Key Id="BasicAuthenticationUsername" StorageReferenceId="UsernameSecret"/>
        <Key Id="BasicAuthenticationPassword" StorageReferenceId="PasswordSecret"/>
        </Cryptographic Keys>
        <InputClaims>
        <InputClaims ClaimTypeReferenceId="SendToProvider" DefaultValue="HelloWorld!"/>
         </InputClaims>
         <OutputClaims>
         <OutputClaim ClaimTypeReferenceId="RestfulResponse"/>
         </OutputClaims>
</TechnicalProfile/>
```

Figure 3:
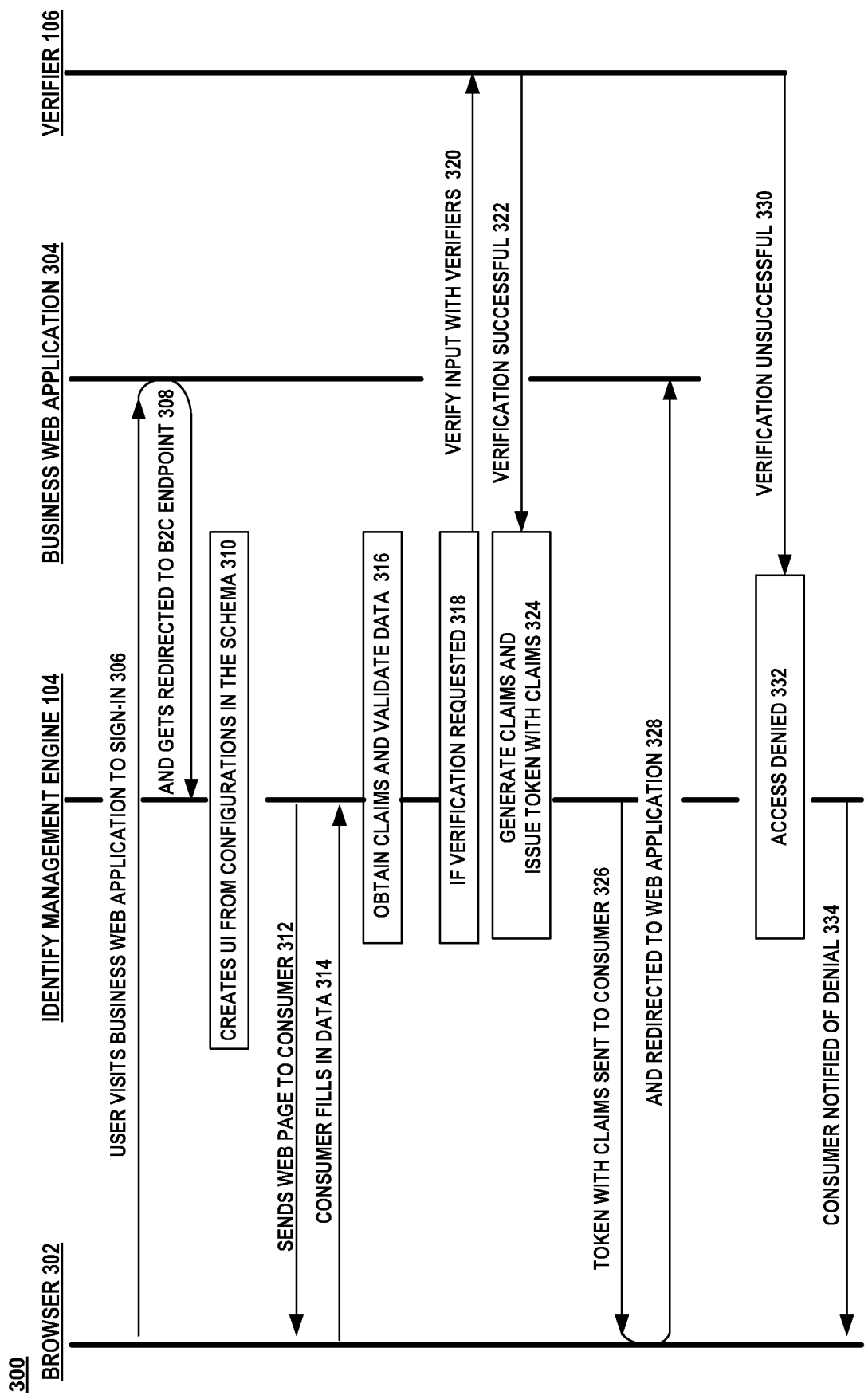
FIG. 3 is a schematic diagram illustrating an exemplary method of the identity management engine in generating and verifying claims dynamically at a sign-in process.

Attention now turns to FIG. 3 which illustrates an exemplary method 300 to obtain and process the claims. In one aspect, the method involves communications between a browser 302 of a computing device used by a consumer, the identity management engine 104 of the B2C cloud service, a business's web application 304 and a verifier 106. A consumer, using a browser 302 on a computing device, seeks to sign-in to a particular business's website (block 306). The consumer is previously registered with the business and may use an existing account with the B2C cloud service. The consumer may transmit a sign-in request through a third party identity provider, such as without limitation, Google+, Facebook, Amazon, Linkedin, etc.

The business's website is hosted by the B2C cloud service. The sign-in request is redirected to an endpoint of the B2C cloud service (block 308). The sign-in request is directed to the identity management engine 104 which obtains the schema of the business (block 310). The identity management engine 104 utilizes the configurations denoted in the schema to create a web page that when executed by the consumer's browser generates a user interface (block 310). The user interface is customized for the business associated with the sign-in request (block 310). The user interface may be embodied in a web page implemented in a markup language document, such as an HTML file or other type of markup language document (block 310). The web page is then transmitted to the consumer's browser (block 312).

The consumer fills out the requested information in the user interface which is transmitted to the identity management engine 104 (block 314). The identity management engine 104 obtains the claims and validates the values in the claims based on the defined values in the schema (block 316). If a claim requires verification (block 318), then the verification may be performed as indicated in the schema (block 320). The verification may be performed internally within the B2C cloud service or through a third party source (block 320). In one or more aspects, the verification may be performed by invoking Representational State Transfer (RESTful) web services. A RESTful web service exposes a set of resources through Uniform Resource Identifiers (URIs).

If the verification is successful (block 322), the identity management engine 104 embeds the claims into a security token (block 324). The security token is then sent to the consumer's browser (block 326) where it is redirected to the business's web application (block 328). The business's web application uses the security token and claims to authorize the consumer to access those resources identified in the claims. In one aspect, the authorization may be performed in accordance with the OAuth 2.0 authorization protocol.

When the verification is not successful (block 330), the identity management engine 104 denies the sign-in request and access (block 332) and the consumer is notified of the denial of the access (block 334).

Exemplary Operating Environment

Figure 4:
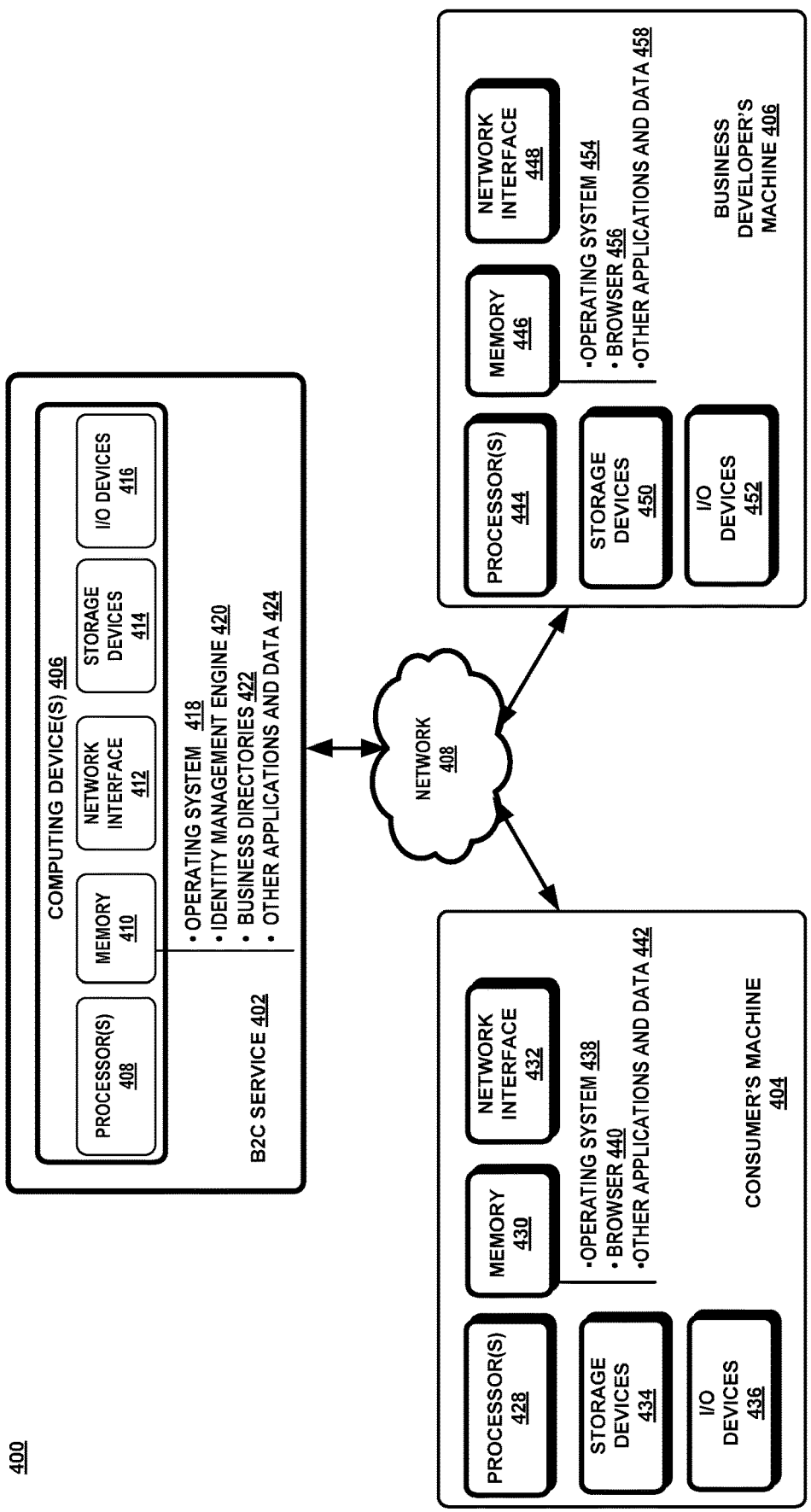
FIG. 4 is a block diagram illustrating an exemplary operating environment.

Attention now turns to FIG. 4 and a discussion of an exemplary operating environment. It should be noted that the operating environment 400 is exemplary and is not intended to suggest any limitation as to the functionality of the embodiments. The embodiments may be applied to an operating environment 400 having a B2C service 402, a consumer's machine 404, a business developer's machine 406 coupled through network 408. The B2C service 402 may be implemented as a cloud service that is available on demand through the Internet. The B2C service 402 utilizes multiple computing devices 406 which may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 400 may be configured in a network environment, a distributed environment, a multi-processor environment, or a stand-alone computing device having access to remote or local storage devices.

A computing device 406 may include one or more processors 408, a memory 410, a network interface 412, storage devices 414, and one or more input/output (I/O) devices 416. A processor 408 may be any commercially available processor and may include dual microprocessors and multi-processor architectures. The network interface 412 facilitates wired or wireless communications between the computing device 406 and other devices. The storage devices 414 may be computer-readable medium that does not contain propagating signals, such as modulated data signals transmitted through a carrier wave. Examples of the storage device 414 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. The I/O devices 416 may include a keyboard, mouse, pen, voice input device, touch input device, a display, speakers, printers, etc., and any combination thereof.

The memory 410 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 410 may also include one or more external storage devices or remotely located storage devices that do not pertain to propagated signals, such as modulated data signals transmitted through a carrier wave.

The memory 410 may contain instructions, components, and data. A component is a software program that perform a specific function and is otherwise known as a module, application, and the like. The memory 410 may include an operating system 418, an identity management engine 420, one or more business directories 422, and various other applications, components, and data 424.

The consumer's machine 404 and the business developer's machine 406 also includes one or more processors 428, 444, a memory 430, 446, a network interface 432, 448, storage devices 434, 450 and I/O devices 436, 452 as described above. The memory 430 of the consumer's machine may include an operating system 438, a browser 440, and other applications and data 442. The memory 446 of the business developer's machine may include an operating system 454, a browser 456, and other applications and data 458.

The network 408 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of providing a customized sign-in process for those web applications or web sites hosted by a B2C cloud service. The technical features associated with addressing this problem uses a declarative mechanism that allows a business to self-assert the claims that are to be used to access its applications and resources by its consumers within the identity management framework of the B2C cloud service. The self-assertion capability allows the business to be a claims provider within the identity framework of the B2C cloud service. In this manner, the hosted cloud service has the ability to provide a custom-tailored sign-in process suitable for its purposes.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
    at least one processor and a memory; and
    wherein the at least one processor is configured to perform acts that:
        access a Business-to-Consumer (B2C) cloud service that hosts an instance of a cloud service for a business, the B2C cloud service includes an identity management engine that manages authentication of a consumer of the business for access to the hosted instance of the cloud service, wherein the business provides a schema that identifies a custom configuration of a sign-in process for the consumer of the business, wherein the schema identifies a claim for the hosted instance of the cloud service;
        upon receipt of a request by the consumer to sign-in to the hosted instance of the cloud service, dynamically create by the identity management engine, a web page for use by the consumer to submit the claim for access to the hosted instance of the cloud service, wherein the web page is based on the schema, wherein the claim is identified from the schema;
        upon receipt of the claim, validate the claim;
        upon successful validation of the claim, embed the claim into a security token that is provided to the consumer; and
        provide access to the hosted instance of the cloud service upon receipt of the security token at the hosted instance of the cloud service.

2. The system of claim 1, wherein the at least one processor is configured to perform acts that:
    prior to embedding the claim into a security token, verify the claim.

3. The system of claim 2, wherein the verification is provided by an external source.

4. The system of claim 2, wherein the verification is facilitated through invoking a RESTful web service.

5. The system of claim 1, wherein the schema indicates that the claim is to be trusted and not requiring verification.

6. The system of claim 1, wherein the schema indicates that the claim needs to be verified.

7. The system of claim 1, wherein the schema is configured as an Extensible Markup Language (XML) file and/or a Javascript Notation (JSON) file.

8. The system of claim 7, wherein the at least one processor is configured to perform acts that:
    generate the web page from the XML file or the JSON file, wherein the web page represents a user interface.

9. The system of claim 1, wherein the security token is formatted as a JSON web token (JWT).

10. The system of claim 8, wherein the at least one processor is further configured to transform the XML file into an HTML file representing the user interface.

11. A method performed on a computing device having at least one processor and a memory, the method comprising:
    configuring a Business-to-Consumer (B2C) cloud service to host an instance of a cloud service for a business, the B2C cloud service including an identity management engine that manages authentication of a consumer of the business to access the hosted instance of the cloud service;
    receiving from the business a schema that identifies a custom configuration of a sign-in process for the consumer of the business, wherein the schema identifies a claim to access the hosted instance of the cloud service;
    dynamically creating, by the identity management engine, a web page for use by the consumer to submit the claim for access to the hosted instance of the cloud service, wherein the web page is based on the schema;
    validating the claim upon receipt of the claim;
    embedding the claim into a security token that is provided to the consumer; and
    upon receipt of the security token, at the hosted instance of the cloud service, facilitating access to the hosted instance of the cloud service.

12. The method of claim 11, further comprising: verifying the claim prior to embedding the claim into the security token.

13. The method of claim 12, wherein the verification is provided by an external source.

14. The method of claim 12, wherein the verification is facilitated through invoking a RESTful web service.

15. The method of claim 11, wherein the schema indicates that the claim is to be trusted and not requiring verification.

16. The method of claim 11, wherein the schema indicates that the claim needs to be verified.

17. The method of claim 11, wherein the schema is configured as an Extensible Markup Language (XML) file and/or a Javascript Notation (JSON) file.

18. The method of claim 11, further comprising:
    generating a web page from the schema that comprises a user interface.

19. The method of claim 11, wherein the security token is a JSON web token (JWT).

20. The method of claim 11, wherein the schema indicates one or more verifiers to verify the claim.

* * * * *